(No Model.)
H. A. RAUERT.
COMBINED BICYCLE PANTS GUARD AND LOCK.
No. 573,104. Patented Dec. 15, 1896.
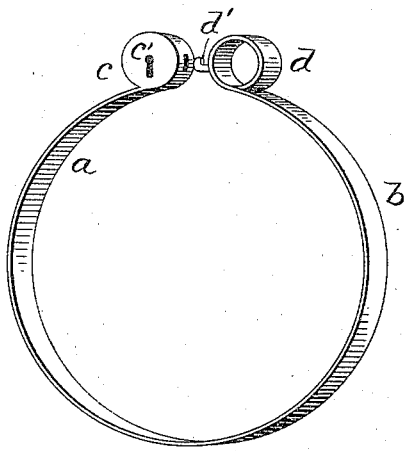
Witnesses
Charles B. Cheyney.
Geo. M. Copenhaver.
Inventor
Henry A. Rauert
By T. J. Geisler,
Attorney

UNITED STATES PATENT OFFICE.

HENRY A. RAUERT, OF PORTLAND, OREGON, ASSIGNOR OF ONE-HALF TO ROBERT SWAIN, OF SAME PLACE.

COMBINED BICYCLE PANTS-GUARD AND LOCK.

SPECIFICATION forming part of Letters Patent No. 573,104, dated December 15, 1896.

Application filed June 19, 1896. Serial No. 596,183. (No model.)

*To all whom it may concern:*

Be it known that I, HENRY A. RAUERT, a citizen of the United States, residing at Portland, in the county of Multnomah and State of Oregon, have invented a new and useful Combined Bicycle Pants-Guard and Lock, of which the following is a specification.

The object of my invention is to adapt the well-known pants-guard used by cyclists to serve as a bicycle-lock as well. This I accomplish as shown in the accompanying drawing, which shows my invention in perspective.

The letters designate the parts referred to.

I use for my invention the usual clasp or clip commonly known as a "pants-guard." The ends of the arms *a b* of this clip are turned back to form small loops *c d*, in one of which, *c*, I provide a spring-lock *c'*, and to the other of which I fix a tongue or catch *d'*. Thus the ends *c d* may be locked together.

The clip may be used as a pants-guard as usual, and when not riding the same clip may be used as a lock for securing one of the wheels of the bicycle.

Having thus described my invention, I claim—

1. A combined bicycle-lock and pants-guard comprising a metallic spring curved in substantially circular form, its ends lying adjacent to each other when said spring is not under tension, one of said ends carrying a tongue, and the other a spring-lock, the latter being provided with an aperture to receive said tongue, said tongue and aperture being so arranged on the opposite ends of the spring that the tongue will enter the aperture when said ends are brought together and so lock said ends together, substantially as described.

2. A combined bicycle-lock and pants-guard comprising a metallic spring curved in substantially circular form, its ends curved in reverse circles, as shown, one of said circles inclosing a spring-lock, and the other carrying a tongue, said circular ends lying adjacent to each other when the spring is not under tension, the lock being provided with an aperture for the tongue arranged relatively to the tongue so that the latter will enter the aperture when the curved ends are brought together, and so lock said ends together, substantially as described.

In testimony whereof I have hereunto set my hand this 29th day of May, 1896.

HENRY A. RAUERT.

Witnesses:
ALEX. WAGNER,
J. GEISLER.